United States Patent [19]
Baltus et al.

[11] Patent Number: 5,808,509
[45] Date of Patent: Sep. 15, 1998

[54] RECEIVER AND DEMODULATOR FOR PHASE OR FREQUENCY MODULATED SIGNALS

[75] Inventors: Petrus G. M. Baltus; Augustus J. E. M. Janssen, both of Eindhoven, Netherlands

[73] Assignee: U.S. Philips Corporation, New York, N.Y.

[21] Appl. No.: 852,711

[22] Filed: May 7, 1997

[30] Foreign Application Priority Data

May 9, 1996 [EP] European Pat. Off. .............. 96201255

[51] Int. Cl.⁶ ................................................. H04L 27/156
[52] U.S. Cl. .......................... 329/300; 329/303; 329/304; 329/310; 375/324
[58] Field of Search .................................. 329/300–310, 329/316; 375/324

[56] References Cited

U.S. PATENT DOCUMENTS 4,322,851  3/1982  Vance ........................................ 329/303
4,942,591  7/1990  Nease et al. ............................. 329/304

FOREIGN PATENT DOCUMENTS 2286950  8/1995  United Kingdom .

OTHER PUBLICATIONS

"A Fully integrated 1V/100μ A high CP–FSK receiver", by Matthijs D. Pardoen, Proceedings of the Workshop Advances in Analogue Circuit Design, Apr. 6–8, 1993, Katholieke Universiteit Leuven, 15 pages.

Primary Examiner—Siegfried H. Grimm

[57] ABSTRACT

In a quadrature receiver for phase and/or frequency modulated signals an intermediate phase signal is quantized to produce a quantized phase signal. The receiver includes a demodulator in which pulses are generated from the quantized phase signal and it is determined whether two successive pulses have different polarities, and if so, a reconstructed baseband signal transition is produced at a predetermined reconstruction instant between the two successive pulses. The reconstruction instant is chosen in the middle between two successive pulses for FSK modulation, and it is chosen at different positions between the two pulses for other types of modulation, such as GMSK or multi-level FSK.

10 Claims, 6 Drawing Sheets

RECEIVER AND DEMODULATOR FOR PHASE OR FREQUENCY MODULATED SIGNALS

BACKGROUND OF THE INVENTION

The present invention relates to a quadrature receiver comprising a demodulator for demodulating phase and/or frequency modulated signals, which demodulator comprises means for generating pulses from a quantised intermediate frequency phase signal generated in the receiver and baseband signal generating means for generating a reconstructed baseband signal from the pulses.

The present invention further relates to demodulator and to a demodulation method. Such a receiver can be a cellular or cordless telephony receiver, a pager, or the like.

A quadrature receiver of this kind is known from the British Patent Application No. 2 286 950. Herein, a quadrature receiver is described wherein an intermediate phase signal is quantised by hard-limiting intermediate frequency quadrature signals. Such a receiver should have a phase resolution that is sufficient in view of the vector rotation per received data bit of the quantised phase signal in order to properly decode a received data signal. In this British application a proper phase resolution is achieved by generating additional axes intermediate to in-phase and quadrature phase signal axes, e.g. by means of a ratiometric combiner. The quantised phase signal is demodulated by forming a series a positive and negative pulses from the quantised phase signal, by supplying the series to a lowpass filter and by hardlimiting the filtered series. Despite of the fact that in the known receiver the quantisation step in the phase signal is reduced, in such a receiver there can still be considerable data jitter that can cause inaccurate data detection.

OBJECT AND SUMMARY OF THE INVENTION

It is an object of the present invention to provide a very accurate quadrature receiver that is low cost and has reduced power consumption.

To this end the quadrature receiver according to the present invention is characterized in that the baseband signal generating means is arranged for determining whether two successive pulses have a different polarity, and, if so, for generating a reconstructed baseband signal transition at a predetermined reconstruction instant between the two successive pulses. The present invention is based upon the insight that the quantised phase signal has deterministic properties around baseband signal transitions and that baseband signal transitions are located between two closest transitions of the quantised phase signal when the quantisation levels are at suitable distances from each other.

In an embodiment of a quadrature receiver according to the present invention, the reconstruction instant is determined in dependance of a modulation method used for modulating the signals such that the instant is optimally adapted to the used modulation method. Herewith, data jitter can virtually be eliminated. When applying FSK (Frequency Shift Keying) as a modulation method, the most appropriate choice of the distance is in the middle between the two successive pulses, when applying offset-FSK, the distances to the pulses are chosen as a function of the offset, and when applying GMSK (Gaussian Minimum Shift Keying), the distances are chosen in accordance with the so-called BT-product (B being the bandwidth of the modulation filter and T being the bit period) of the GMSK-modulation. For multi-level shift keyed signals, the distances can be chosen to be a function of transmitter parameters and reconstructed data and the demodulator can be made adapative so as to adapt the distances within one bit period.

In an embodiment of a quadrature receiver according to the present invention, the means for generating the pulses from the intermediate frequency phase signal comprise pairs of cross-coupled differentiating means of which inputs are coupled to quadrature branches and of which outputs are coupled to a combiner for providing the pulses. Herewith, a simple means is provided for generating the pulses. In the known receiver as described in said British Application No. 2 286 950 positive and negative pulses are generated by means of state comparison means. Such a solution will not function appropriate in combination with the reconstruction method as of the present invention because when it is embodied in an asynchronous logic mode, glitches are generated deteriorating the performance of the reconstruction method according to the present invention, and when it is embodied in a synchronous or clocked mode, it causes data jitter that cannot be eliminated anymore due to the fact that a clock used for the clocked mode will not be synchronised with the data signal and will not be correlated with the jitter. Accordingly, the means for generating the pulses according to the present invention, not making use of states, very advantageously cooperates with the reconstruction method according to the present invention.

In an embodiment of a quadrature receiver according to the present invention, the receiver comprises an interpolation network for forming interpolated signals from quadrature received I-signals and Q-signals. Herewith, accurate additional axes can be made in the quantised phase signal improving the overall performance of the receiver.

In a preferred embodiment, the intermediate frequency is a so-called zero-IF frequency. More generally, the intermediate frequency should be low-IF such that both positive and negative pulses can be formed.

BRIEF DESCRIPTION OF THE DRAWINGS

The present invention will now be described, by way of example, with reference to the accompanying drawings, wherein.

Throughout the figures the same reference numerals are used for the same features.

DETAILED DESCRIPTION OF THE PREFERRED EMBODIMENT

Figure 1:
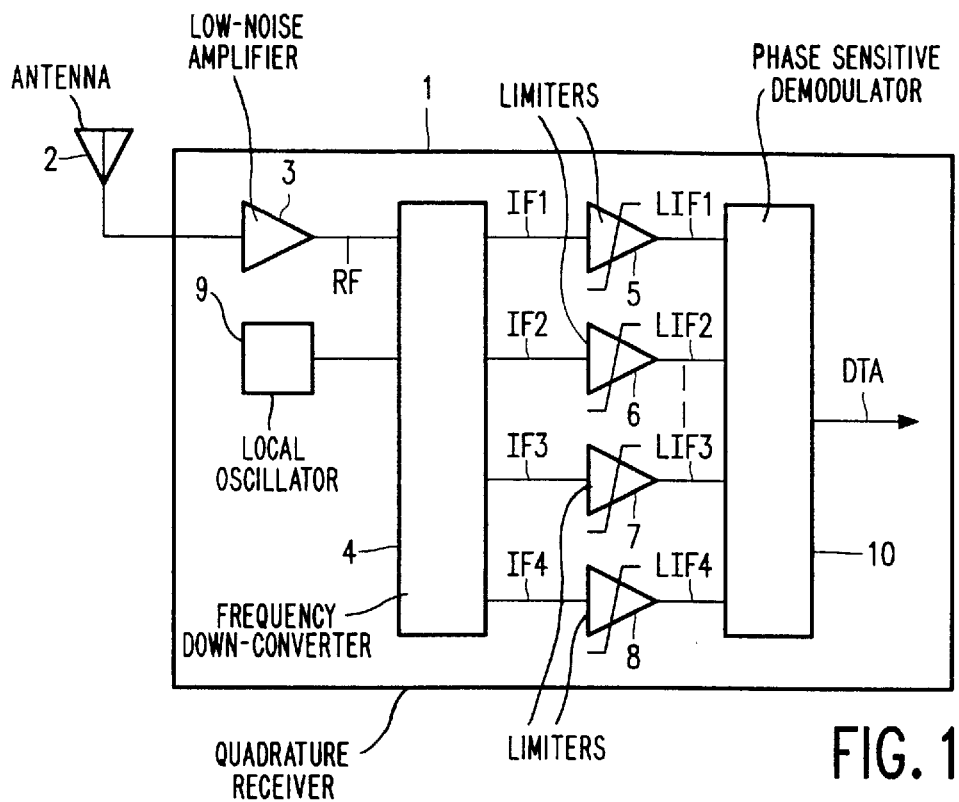
FIG. 1 shows a block diagram of a quadrature receiver according to the present invention.

FIG. 1 shows a block diagram of a quadrature receiver 1 according to the present invention, coupled to an antenna 2 for receiving RF-signals. The receiver 1 comprises a low-noise RF-amplifier 3 coupled to a frequency down-converter 4 for down-converting the RF-signal to intermediate frequency signals IF1, IF2, IF3 and IF4 forming an intermediate frequency phase signal which is quantised by means of limiters 5, 6, 7 and 8 so as to form a quantised intermediate frequency phase signal represented by limited intermediate frequency signals LIF1, LIF2, LIF3, and LIF4. The quantised intermediate frequency phase signal can be represented in a quadrature state diagram as described in FIG. 4 of said British patent application No. 2 286 950. The frequency down-converter 4 can be arranged for forming any desired number of intermediate states, the number of phase states determining the phase resolution. The receiver 1 further comprises a local oscillator 9 coupled to the frequency down-converter 4 and a phase sensitive demodulator 10 providing a reconstructed baseband signal DTA, a baseband data signal.

Figure 2:
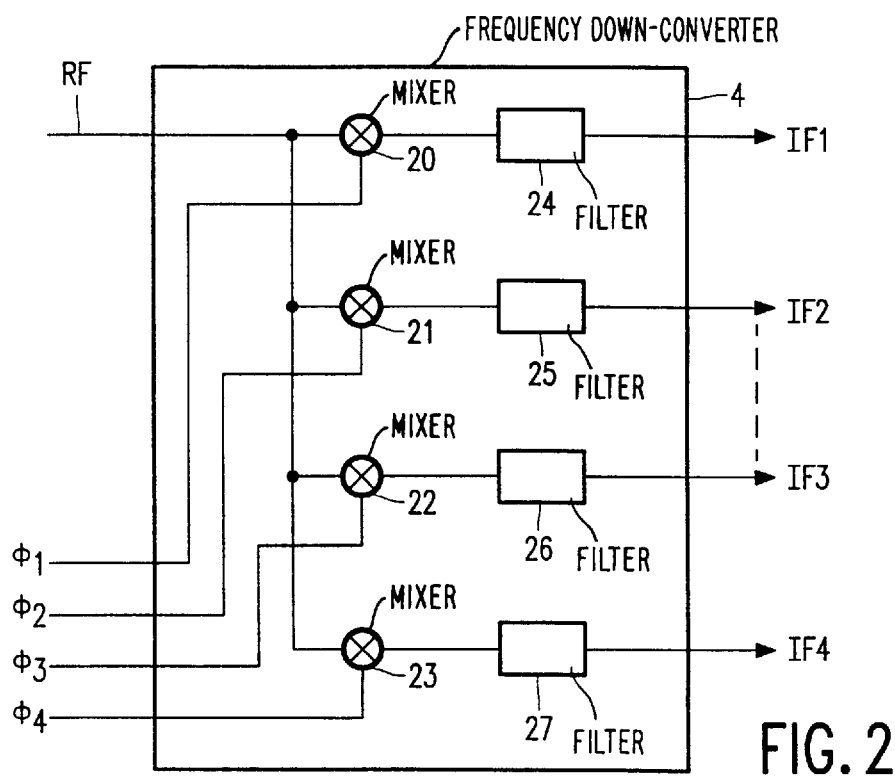
FIG. 2 shows a first frequency down-converter in a receiver according to the present invention.

FIG. 2 shows a first embodiment of the frequency down-converter 4 in the receiver 1 according to the present invention, comprising mixers 20, 21, 22 and 23 for mixing down the RF-signal RF using oscillator signal generated by the local oscillator 9, with the proper phases $\phi_1$, $\phi_2$, $\phi_3$ and $\phi_4$, namely 0, 45, 90, and 135 degrees. The frequency down-converter 4 further comprises filters 24, 25, 26 and 27. The phase resolution can be increased by adding mixers. Such a frequency down-converter 4 is described in more detail in the Article "A Fully integrated 1V/100 $\mu$A high bitrate CP-FSK receiver", M. D. Pardoen, Proceedings of the Workshop Advances in Analogue Circuit Design, Apr. 6–8, 1993, Katholieke Universiteit Leuven, 15 pages.

Figure 3:
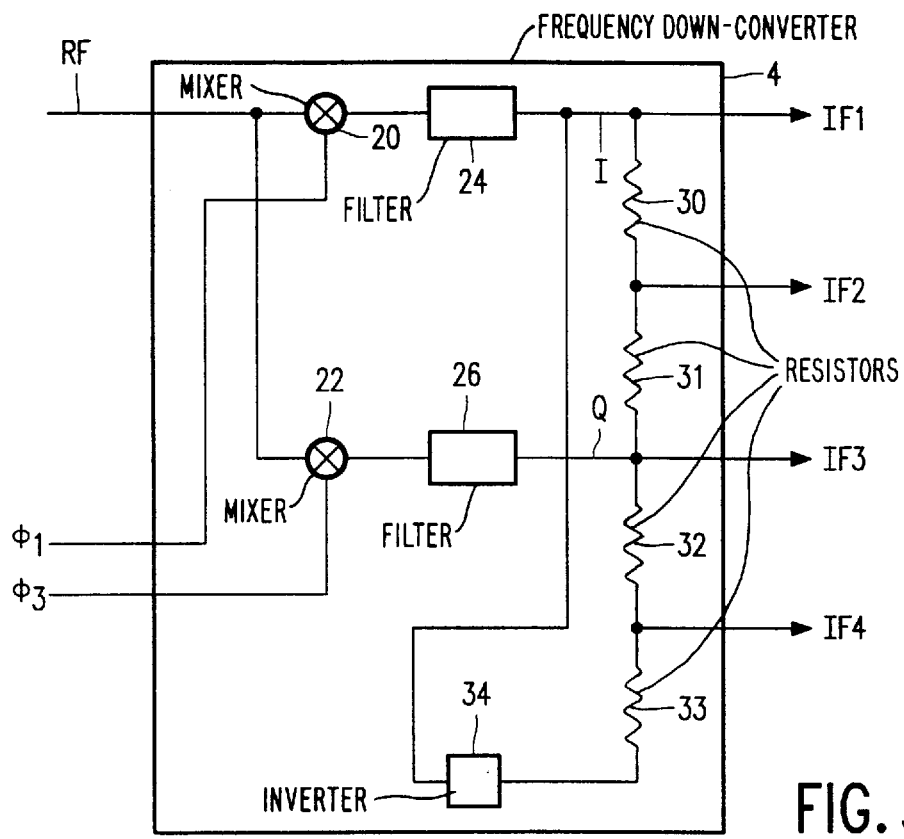
FIG. 3 shows a second frequency down-converter in a receiver according to the present invention.

FIG. 3 shows a second embodiment and preferred embodiment of the frequency down-converter 4 in the receiver 1 according to the present invention, providing quadrature signals I and Q. The frequency down-converter 4 comprises an interpolation network for forming the signals IF2 and IF4 as interpolated signals of the signals I and Q, the network comprising a series-arrangement of resistors 30 and 31 coupled between the I and Q-branch at a tap of which the signal IF2 is provided and a series-arrangement of resistors 32 and 33 coupled between the I-and Q-branch at a tap of which the signal IF4 is provided, the resistor 33 being coupled to the I-branch via an inverter 34.

Figure 4:
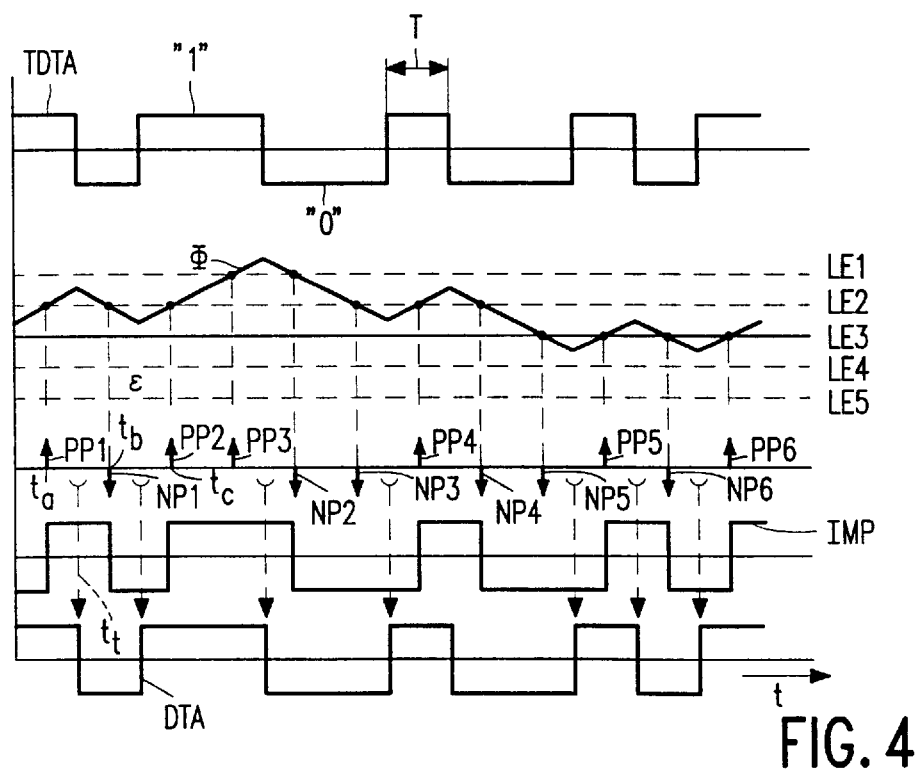
FIG. 4 shows a timing diagram of a baseband signal reconstruction according to the present invention.

FIG. 4 shows a timing diagram of the baseband signal reconstruction according to the present invention as a function of time t. A baseband data signal TDTA to be transmitted to and to be received by the quadrature receiver 1 is shown, the signal TDTA representing data of a first logic level "1" and a second logic level "0" and the data having a symbol period T. According to the present invention, the receiver 1 determines the reconstructed data signal DTA from the received signal RF after frequency-down-conversion from a phase signal $\Phi$ of a composite limited intermediate frequency signal formed by the signals LIF1, LIF2, LIF3, and LIF4. In the example given, the phase signal $\Phi$ represents phase information comprised in the four signals IF1 to IF4. Five phase quantisation levels LE1, LE2, LE3, LE4, and LE5 are distinguished. Generally, the number of quantisation levels depends on the data to be detected. In the demodulator 10, respective positive and negative pulses PP1, PP2, PP3, PP4, PP5, and PP6, and NP1, NP2, NP3, NP4, NP5, and NP6 are generated from the phase signal $\Phi$ in the given example in the sequence PP1, NP1, PP2, PP3, NP2, NP3, PP4, NP4, NP5, PP5, NP6, and PP6, as indicated. Each time when the phase signal $\Phi$ passes a quantisation level while having a positive slope, a positive pulse is generated, and each time when the phase signal $\Phi$ passes a quantisation level while having a negative slope, a negative pulse is generated. For a virtually perfect reconstruction, the present invention makes use of the deterministic properties of the phase function around a transition of the transmitted baseband signal TDTA. It has been realized that when the reconstruction instant is chosen to be a predetermined instant $t_r$ between two successive pulses of opposite polarity that then a very good reconstruction of the data signal TDTA can be achieved. The predetermined instant is chosen in dependance of the modulation method. More generally, the predetermined instant is a function of transmitter parameters and reconstructed data. In case of FSK-modulation, the predetermined instant is substantially in the middle of two pulses, in case of offset-FSK-modulation, the predetermined instant is weighted with the FSK-offset, and in case of GMSK-modulation, the distance from the predetermined instant to the successive opposite pulses is a function of the BT-product of the GMSK-modulation signal. In the case of offset-FSK-modulation, a weighting factor $\epsilon$ for weighting the predetermined instant $t_r$ is determined as follows. $\epsilon=[2T-(t_c-t_a)]/(t_c-t_a)$, wherein $t_a$, $t_b$ and $t_c$ are instants of a succession of a positive pulse, a negative pulse and a positive pulse. Then, the predetermined instant $t_r=[(t_a+t_b)/2]+0.5\epsilon(t_a-t_b)$. Furthermore, for offset-FSK, it holds that the frequency difference in frequency offsets of a "0" and a "1" datum is $\epsilon/2\pi$. In the example given, FSK-modulation is applied so that the reconstruction instants are in the middle of two successive opposite pulses, i.e. in the middle of the pulses PP1 and NP1, NP1 and PP2, PP3 and NP2, NP3 and PP4, NP5 and PP5, and NP6 and PP6, assuming sufficient quantisation levels. The number of quatisation levels needed for reconstruction is a function of the minimum phase excursion within the symbol period T. Apart from the reconstructed data signal DTA, an imperfect reconstructed data signal IMP is shown that would have been the result of an imperfect reconstruction method only using the information comprised in the pulses at the instants that such pulses would occur. The signal IMP is not an exact replica the baseband signal TDTA, whereas the signal DTA is.

Figure 5A:
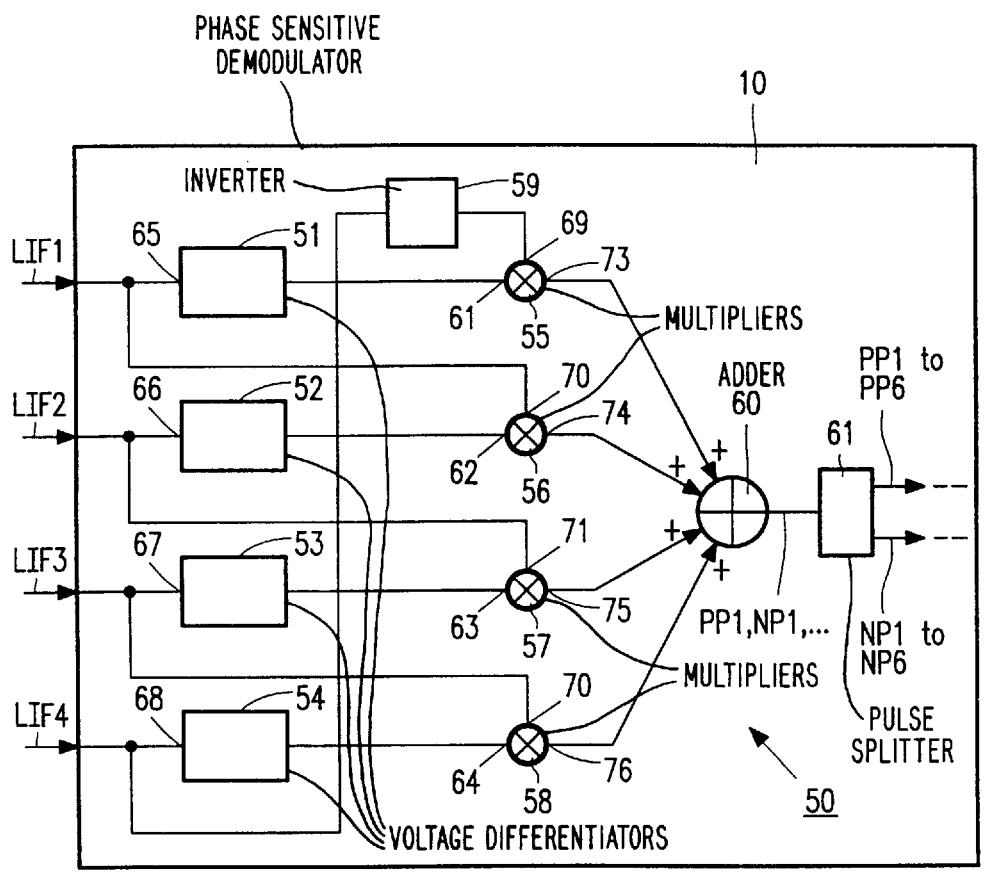
FIG. 5A shows a pulse count arrangement for generating pulses in a demodulator according to the present invention.

FIG. 5A shows a pulse count arrangement 50 for generating pulses in the demodulator 10 according to the present invention. The pulse count arrangement 50 comprises voltage differentiators 51, 52, 53, and 54, multipliers 55, 56, 57, and 58, an inverter 59, and an adder 60. The limited intermediate frequency signals IF1, IF2, IF3, and IF4 are fed to the voltage differentiators 51, 52, 53, and 54, respectively that are coupled at their respective output sides with respective first inputs 61, 62, 63, and 64 of the multipliers 55, 56, 57, and 58. Inputs 65, 66, 67, and 68 of the voltage differentiators 51, 52, 53, and 54 are coupled to second inputs 69, 70, 71, and 72 of the respective multipliers 55, 56, 57, and 58 such that the input 65 is coupled to the input 70, the input 66 is coupled to the input 71, the input 67 is coupled to the input 72, and the input 68 is coupled to the input 69 via the inverter 59. Output signals at outputs 73, 74, 75, and 76 are fed to inputs of the adder 60. Herewith, a phase-sensitive demodulator is achieved in which the pulses PP1, NP1, . . . are generated. The demodulator 10 further comprises a pulse splitter 61 for splitting the stream of positive and negative pulses PP1, NP1, . . . into separate streams of positive and negative pulses, PP1, PP2, . . . , and NP1, NP2, . . . . Instead of the shown pulse count demodulator 50 any suitable demodulator can be used providing positive and negative pulses as described.

Figure 5B:
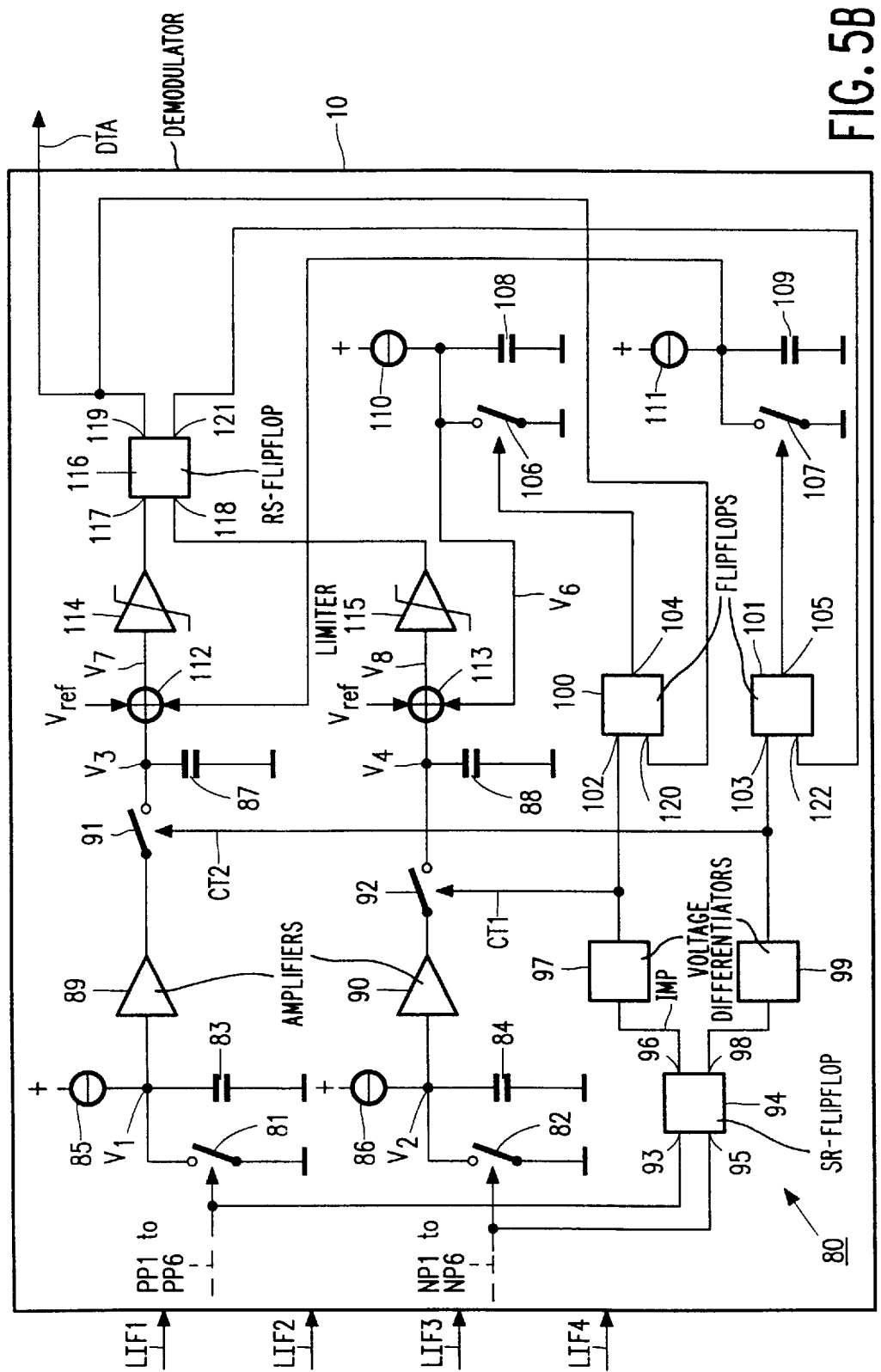
FIG. 5B shows a first embodiment of signal reconstruction according to the present invention.

FIG. 5B shows a first embodiment of signal reconstruction according to the present invention, in the demodulator 10, comprising baseband signal generating means 80 for generating the reconstructed baseband signal DTA from the pulses PP1, NP1, . . . . In this embodiment a perfect reconstruction can be achieved without the need of an extensive memory if the following condition is fulfilled: $X/2<\pi/n<X$, wherein X is the minimum phase excursion within the symbol period T, and n is the number of phase quantisation levels. Herewith, the reconstruction delay remains small and no large memories are needed that would otherwise be needed for storing pulse times of positive or negative pulses when they would have been too far apart, i.e. at distances that could easily exceed two symbol periods. In the baseband signal generating means 80, respective voltages $V_1$ and $V_2$ are generated from the positive and negative pulses, and herefrom voltages $V_3$ and $V_4$ that are proportional to the desired variable time delay that is half the time between two successive opposite pulses, in the case of FSK-modulation. To this end the positive and negative pulses control respective switches 81 and 82 parallel to capacitors 83 and 84, through which load currents flow generated by current sources 85 and 86 when the switches 81 and 82 are open. The voltages $V_3$ and $V_4$ are formed across capacitors 87 and 88 coupled to the capacitors 83 and 84 via respective amplifiers 89 and 90 sensing the voltages $V_1$ and $V_2$ at the capacitors 83 and 84 and via switches 91 and 92 controlled by the positive and negative pulses. For controlling the switches 91 and 92, the positive pulses PP1, . . . are fed to a set-input 93 of an SR-flipflop 94 and the negative pulses NP1, . . . are fed to a reset-input 95 of the SR-flipflop 94, an output 96 of the SR-flipflop providing a control signal CT1 via a voltage differentiator 97 for controlling the switch 92, and an inverse output 98 of the SR-flipflop 94 providing a control signal CT2 for controlling the switch 91 via a voltage differentiator 99. In fact, the imperfect reconstruction signal IMP is available at the output 96 of the SR-flipflop 94 and the signal IMP and its inverse are used to generate voltages $V_5$ and $V_6$ that start and increase with time at data transitions in the signal IMP. This is achieved by coupling the voltage differentiators 97 and 99 to similar switched current sources as for the generation of $V_1$ and $V_2$, formed by SR-flipflops 100 and 101 to which respective set-inputs 102 and 103 the control signals CT1 and CT2 are fed, and which respective reverse outputs 104 and 105 control switches 106 and 107 across capacitors 108 and 109. When the switches 106 and 107 are open, the capacitors 108 and 109 are switches in a load-mode, respective load currents being provided by current sources 110 and 111. For forming voltages $V_7$ and $V_8$ from the voltages $V_3$ and $V_5$ and a negative reference voltage $V_{ref}$, and from the voltages $V_4$ and $V_6$ and the negative reference voltage $V_{ref}$, respectively, adders 112 and 113 are provided that are coupled to limiters 114 and 115. The zero-crossing instants of the voltages $V_7$ and $V_8$ determine the points of time when the reconstructed baseband signal DTA has to make a signal transition so as to get a perfect reconstruction. For getting the signal DTA from the voltages $V_7$ and $V_8$, these voltages are fed to an RS-flipflop 116 of which a reset-input 117 is coupled to the limiter 114, and a set-input 118 is coupled to the limiter 115. A transition of the flipflop 116 is further used to reset the flipflops 100 and 101. An output 119 of the flipflop 116 is used to reset the flipflop 100, the output 119 being coupled to a reset-input 120 of the flipflop 100, and an output 121 of the flipflop 116 is used to reset the flipflop 101, the output 121 being coupled to a reset-input 122 of the flipflop 101.

Figure 6:
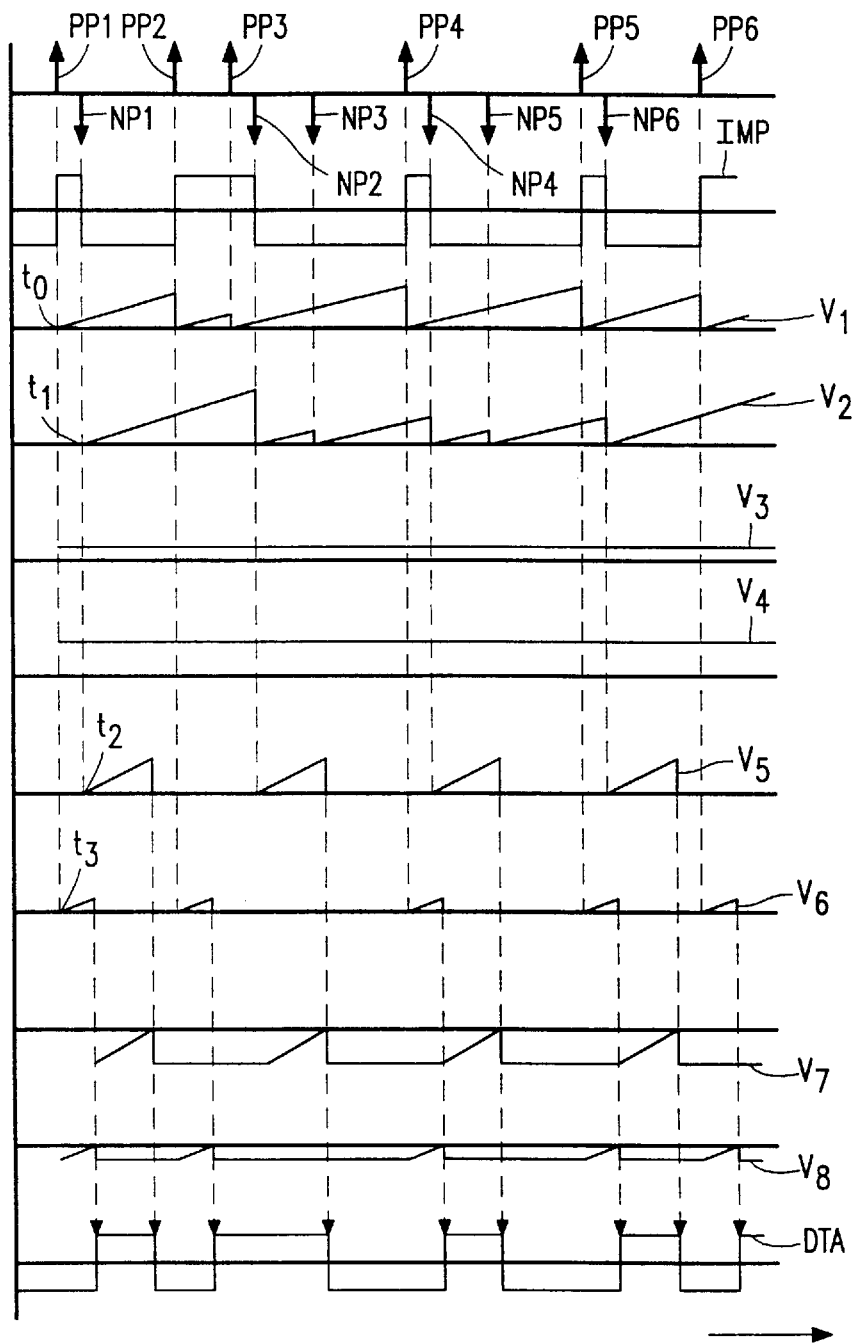
FIG. 6 shows a timing diagram for illustrating the operation of the first embodiment.

FIG. 6 shows a timing diagram in order further to illustrate the operation of the first embodiment. At the output 96 of the flipflop 94, the imperfectly reconstructed signal IMP is available, as described. The signal IMP is a coarse approximation of the transmitted data, of which the data values are right but of which the timing of the data transitions is still wrong. The switch 81 is closed by positive pulses and the switch 82 is closed by negative pulses. If the switch 81 is closed by a positive pulse at the time $t_0$, the capacitor 83 is almost immediately discharged to 0V. If the switch 81 is opened thereafter, the voltage $V_1$ increases with time until the next positive pulse arrives. Similarly, the voltage $V_2$ is generated between switching instants starting from the time $t_1$. The voltages across the capacitors 83 and 84 are sensed by the capacitors 87 and 88 at the time instants when a data transition occurs in the signal IMP having the opposite sign as regards the voltages $V_1$ and $V_2$, respectively. By using signal transitions in the signal IMP instead of the pulses itself, it is prevented that the signal value of the signals $V_3$ and $V_4$ is changed when a number of positive or negative pulses occurs in succession. This is due to the fact that only the time between two successive pulses having opposite sign is of interest. Because the voltages $V_3$ and $V_4$ are proportional to the time distance of two successive pulses of opposite sign, these voltage are a measure for the desired time delay to determine the perfect reconstruction instant. At a "0" to "1" transition of the signal IMP, the flipflop 100 is set, and at a "1" to "0" transition, the flipflop 101 is set. Herewith, the flipflops 100 and 101 indicate, after a given time delay, that a transition in the relevant direction of the signal to be reconstructed will occur. So, if the flipflops 100 and 101 are set, the capacitors 108 and 109 are charged by the current sources 110 and 111, to start with time instants $t_2$ and $t_3$, respectively. The voltages $V_7$ and $V_8$ are formed as described before, and zero-crossings of the voltages $V_7$ and $V_8$ determine the transition instants of the reconstructed signal DTA. The negative reference voltage $V_{ref}$, also determining $V_7$ and $V_8$, determines the total delay between a transition in the original data signal and the reconstructed data signal. In the embodiment given, this delay should be between one and two symbol periods, less than one symbol period causing causality problems and more than two symbol periods leading to undetected transitions.

Figure 7:
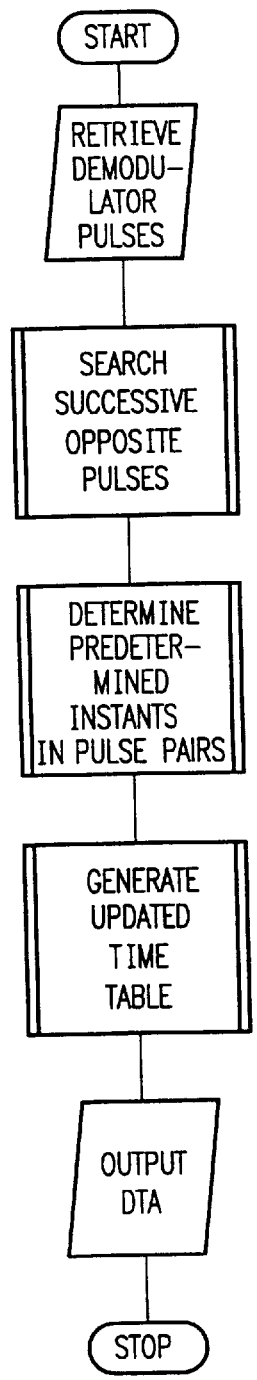
FIG. 7 shows a flow-chart of a second embodiment of signal reconstruction according to the present invention.

FIG. 7 shows a flow-chart of a second embodiment of signal reconstruction according to the present invention. In this embodiment, the major part of the hardware embodiment as described can be replaced by a programmed DSP (Digital Signal Processor), or the like. I.e., the pulses PP1, NP1, . . . are fed to an input port of the DSP and the reconstructed data becomes available at an output port of the DSP. The DSP (not shown in detail), is programmed according to the shown flow-chart. At an internal clock (not shown in detail) of the DSP, the signs of the pulses, together with their times of occurrence are stored in a DSP-memory (not shown in detail), as indicated in block "RETRIEVE DEMODULATOR PULSES" of the flow-chart. Then, the program searches for successive opposite pulse pairs, as indicated in block "SEARCH SUCCESSIVE OPPOSITE PULSES". Thereafter, the program determines the predetermined instant between such pairs of pulses, indicated in block "DETERMINE PREDETERMINED INSTANTS IN PULSE PAIRS". Next, an updated time table is determined indicating the instants of determined output data transitions, indicated in block "GENERATE UPDATED TIME TABLE". At last, the reconstructed data DTA is generated at an output port (not shown in detail) of the DSP at the instants as determined by the updated time table, a "0" to "1" transition being generated after a positive pulse and a "1" to "0" generated after a negative pulse. So it is determined at what point of time and in which direction the data changes. Outputting of the data DTA is indicated in block "OUTPUT DTA".

We claim:

1. A quadrature receiver comprising a demodulator for demodulating phase and/or frequency modulated signals, which demodulator comprises means for generating pulses from a quantised intermediate frequency phase signal generated in the receiver, and baseband signal generating means for generating a reconstructed baseband signal from the pulses, characterised in that the baseband signal generating means is arranged for determining whether two successive pulses have a different polarity, and, if so, for generating a reconstructed baseband signal transition at a predetermined reconstruction instant between the two successive pulses.

2. A quadrature receiver according to claim 1, wherein the reconstruction instant is determined dependance of a modulation method used for modulating the signals such that the instant is optimally adapted to the used modulation method.

3. A quadrature receiver according to claim 2, wherein the modulated signals are frequency shift keyed signals and the reconstruction instant is substantially in the middle between the two successive pulses.

4. A quadrature receiver according to claim 2, wherein the modulated signals are offset frequency shift keyed signals and the reconstruction instant is a function of a frequency offset.

5. A quadrature receiver according to claim 2, wherein the modulated signals are Gaussian minimum shift keyed signals and the reconstruction instant is a function of a so-called BT-product of the Gaussian modulated signals.

6. A quadrature receiver according to claim 2, wherein the modulated signals are multi-level frequency shift keyed signals and the reconstruction instant is a function of transmitter parameters and reconstructed data, and wherein the demodulator comprises means for adapting the reconstructive instant within one bit period in dependance of the transmitter parameters and the reconstructed data.

7. A quadrature receiver according to claim 1 wherein the means for generating the pulses from the intermediate frequency phase signal comprise pairs of cross-coupled differentiating means of which inputs are coupled to quadrature branches and of which outputs are coupled to a combiner for providing the pulses.

8. A quadrature receiver according to claim 7, wherein the receiver comprises an interpolation network for forming interpolated signals from quadrature received I-signals and Q-signals.

9. A demodulator for demodulating phase and/or frequency modulated signals, which demodulator comprises means for generating pulses from a quantised intermediate frequency phase signal generated in a receiver, and baseband signal generating means for generating a reconstructed baseband signal from the pulses, characterised in that the baseband signal generating means is arranged for determining whether two successive pulses have a different polarity, and, if so, for generating a reconstructed baseband signal transition at a predetermined reconstruction instant between the two successive pulses.

10. A demodulation method for demodulating phase and/or frequency modulated signals, in which pulses are generated from a quantised intermediate frequency phase signal, and a reconstructed baseband signal is generated from the pulses, characterised in that it is determined whether two successive pulses have a different polarity, and, if so, a reconstructed baseband signal transition is generated at a predetermined reconstruction instant between the two successive pulses.

* * * * *